July 8, 1941.                     P. KOLLSMAN                     2,248,878
                              MEASURING INSTRUMENT
                              Filed June 8, 1940                 3 Sheets—Sheet 2

INVENTOR
PAUL KOLLSMAN
BY
his ATTORNEY

July 8, 1941.　　　　P. KOLLSMAN　　　　2,248,878
MEASURING INSTRUMENT
Filed June 8, 1940　　　　3 Sheets-Sheet 3
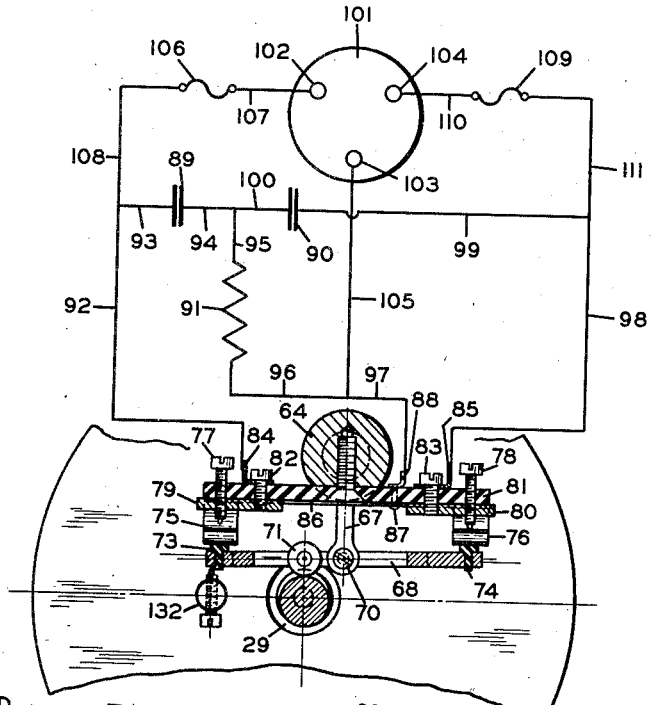
FIG. 5
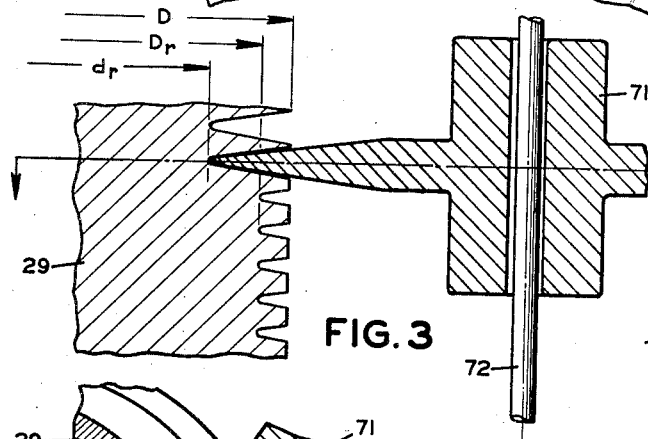
FIG. 3
FIG. 4
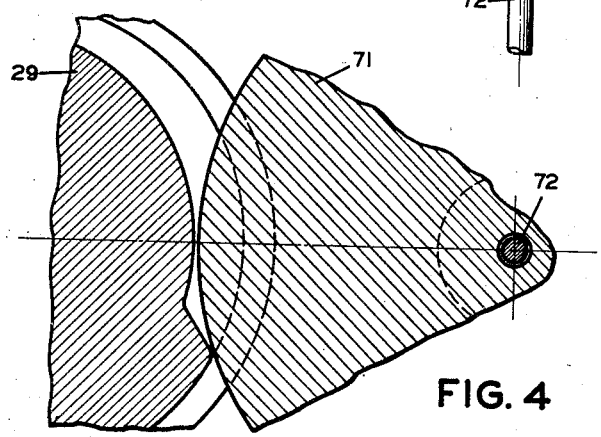
FIG. 6
INVENTOR
PAUL KOLLSMAN
BY
his ATTORNEY Patented July 8, 1941

2,248,878

UNITED STATES PATENT OFFICE 2,248,878

MEASURING INSTRUMENT

Paul Kollsman, New York, N. Y., assignor to Square D Company, Detroit, Mich., a corporation of Michigan Application June 8, 1940, Serial No. 339,519

35 Claims. (Cl. 200—56)

This instrument relates to improvements in measuring instruments equipped with an electric contact device.

It is an object of this invention to provide in a measuring instrument, a contact device which will not decrease the accuracy or sensitivity of the instrument.

It is a further object of this invention to provide, in an instrument having a wide range of measurement, a contact device capable of closing or opening an electric circuit at a predetermined point within said wide range.

More particularly, it is an object to provide in an instrument in which the actuating member, such as the pointer, makes several revolutions, a contact device actuable from said member at a predetermined point within one of the several revolutions.

Illustrating this object by an example, the invention aims at providing a contact device suitable for a sensitive altimeter in which the sensitive pointer makes 35 revolutions within the range of 35,000 feet, the contact being sufficiently accurate to close or open a circuit within approximately 15 feet of altitude corresponding to approximately 6° of angular movement of the pointer.

From one point of view the invention broadly aims at providing a contact device controlled by a threaded spindle.

From another aspect the invention aims at providing a cam actuated contact device presettable for actuation at a predetermined condition, the said condition being preferably readable on the instrument.

A further object of the invention is to provide a cam operated contact device for use in connection with an operating member capable of making several revolutions in which the cam forms a part of a threaded spindle having a portion of lesser and a portion of larger diameter.

Specifically the invention aims at providing a contact device actuable by the movement of a roller engaging the thread of a spindle having a portion of lesser and a portion of larger diameter.

From another aspect the invention aims at providing a contact device including a threaded spindle and a roller engaging said spindle in which the roller is axially movable parallel to the spindle and in which a contact is operated at one point of such axial movement of the roller.

Further aims, objects and advantages of this invention will appear from a consideration of the description which follows with accompanying drawings showing for purely illustrative purposes embodiments of this invention. It is to be understood, however, that the description is not to be taken in a limiting sense, the scope of the invention being defined in the appended claims.

Referring to the drawings:

Fig. 3 is a fragmentary longitudinal section through elements shown in Figs. 1 and 2;

Fig. 4 is a plan view on line 4—4 of Fig. 3;

Fig. 5 shows in part a plan view of the contact device shown in Figs. 1 and 2 and a wiring diagram; and Fig. 6 is a modified form of the contact device.

The present invention is applicable to any measuring instrument in which an element is rotatable in response to the magnitude of a physical condition such as pressure, temperature, humidity, flow, torque, or others. In the following description, the invention is explained as applied to a sensitive altimeter responsive to changes in atmospheric pressure, it being understood that this specific application is illustrated and described to explain the nature and operation of the invention without limiting the invention to the illustrated application.

Figure 1:
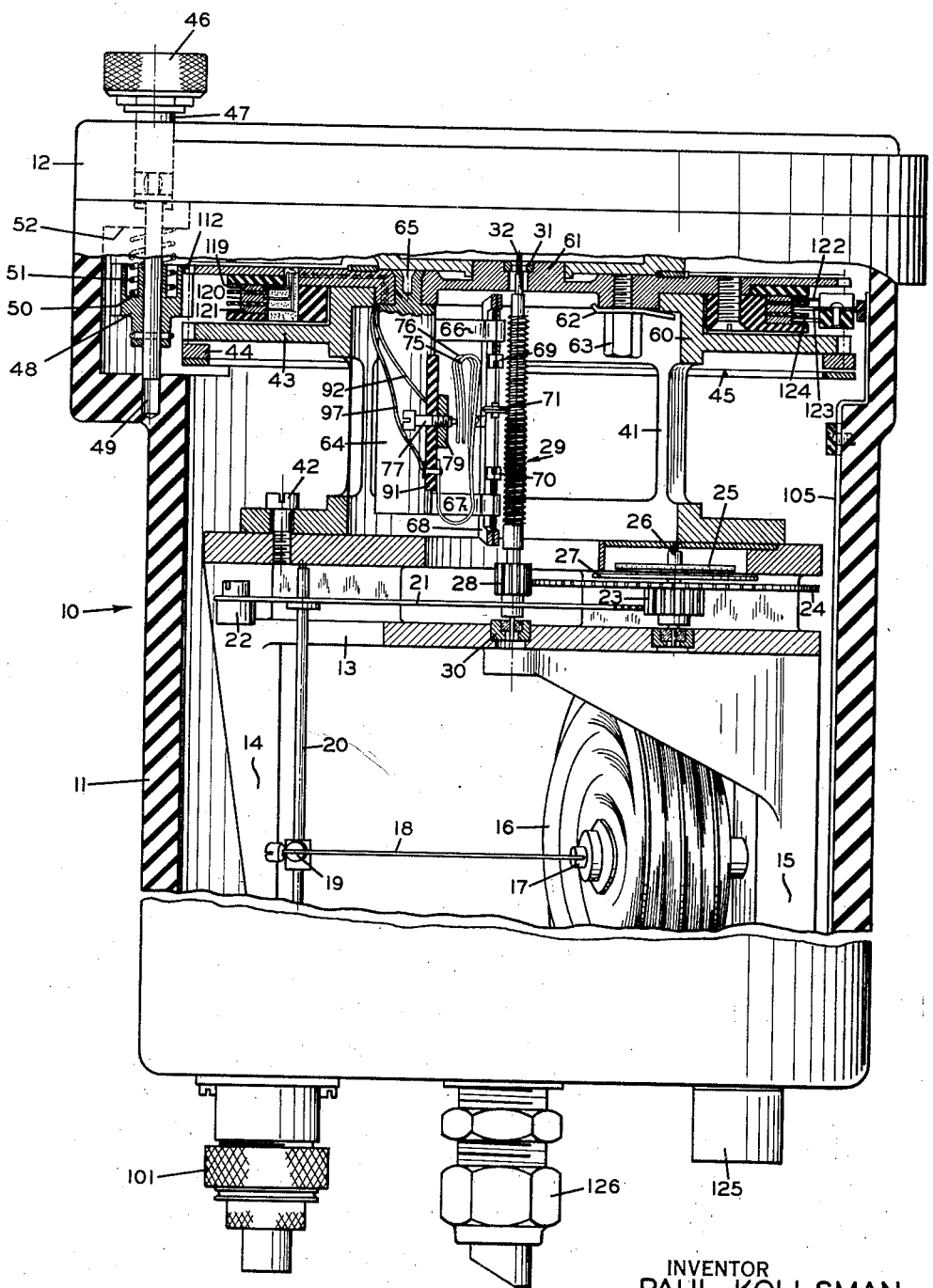
Fig. 1 is a side elevation partly in section of a measuring instrument embodying the invention.

In Fig. 1 an instrument casing 10 is shown comprising a rear part 11 and a front ring 12 secured thereto, the front ring containing a window through which indicating means are visible (not shown).

An instrument mechanism is mounted inside the instrument case. To a mounting support 13 having arms 14 and 15, there is mounted a member responsive to the magnitude of a physical condition, in the illustrated embodiment a set of aneroid diaphragm capsules 16. The set of capsules is shown as provided with a centerpiece 17 to which a link 18 is pivotally connected. The other end of the link 18 is pivotally connected to an arm 19 of a rocking shaft 20 carrying a toothed segment 21. The segment is provided with a counterweight 22 at one end and meshes with a pinion 23 to which there is connected a large gear 24.

For the purpose of eliminating lost motion in the mechanism, a hair spring 25 is shown connected to the pinion shaft 26 exerting a slight torque thereon just sufficient to remove the play between the teeth of the gears and the play in the link connections. The hair spring is prevented from buckling by means of a disk 27, intermediate the large gear 24 and the hair spring.

The large gear 24 meshes with a pinion 28 which is thus rotated in proportion to the movement of the diaphragm, the latter movement being proportional to the magnitude of the condition to be measured, the atmospheric pressure.

In the illustrated embodiment the pinion 28 drives a threaded spindle 29 mounted in bearings 30 and 31. A pointer shaft 32 is connected to the spindle for operating the indicating means such as a sensitive pointer (not shown in Fig. 1).

Figure 2:
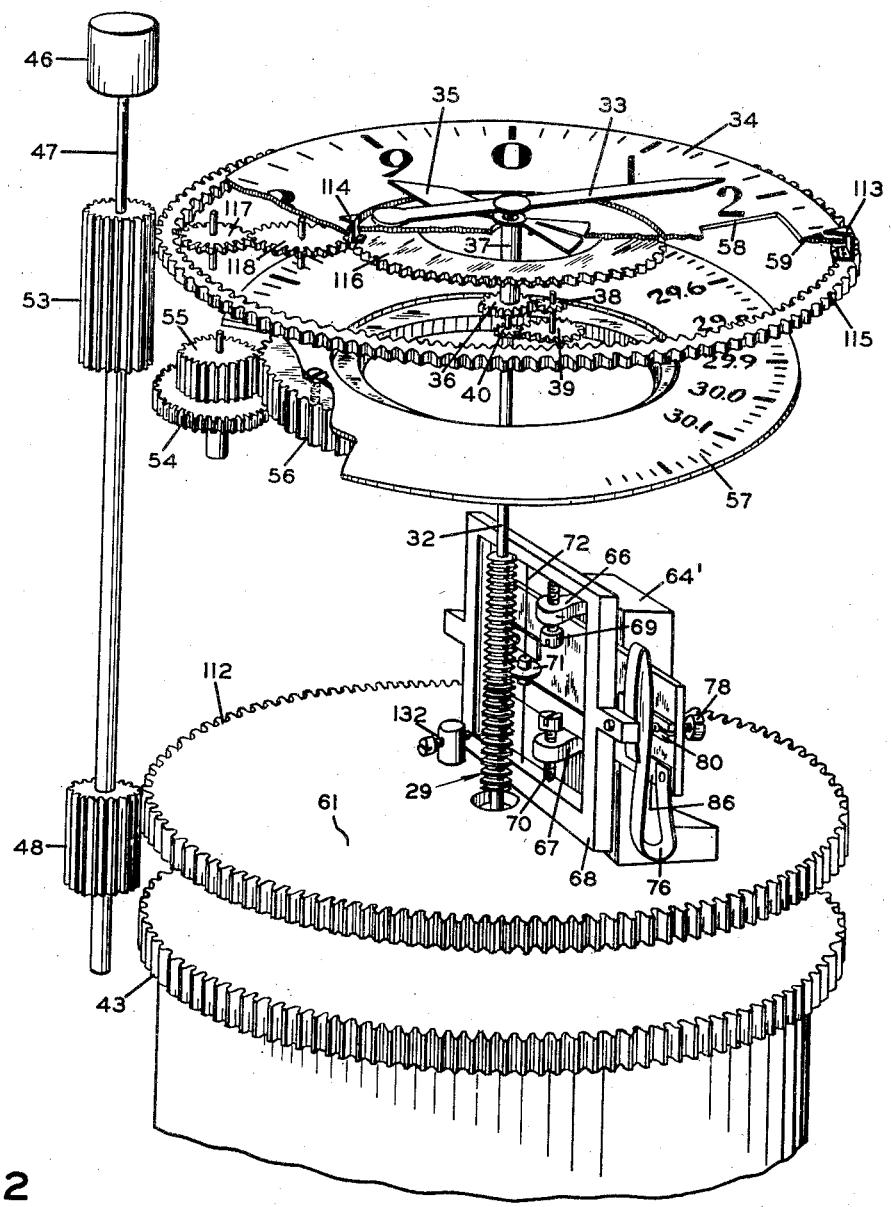
Fig. 2 is an exploded three dimensional view of parts of an instrument similar to the one shown in Fig. 1.

In Fig. 2 a sensitive pointer 33 is shown movable over a dial 34 preferably graduated according to the decimal system. A small pointer 35 is movable over the same dial 34 and readable thereon and driven from a gear 36 to which it is connected by means of a sleeve 37. The gear 36 is driven from the pointer shaft 32 over a gear train 38, 39, 40, the gear 40 being mounted on the shaft 32. In the illustrated embodiment the total ratio of the gear train for the small pointer is 1 to 10 thus causing the small pointer to make one revolution for 10 revolutions of the large pointer.

Reverting to Fig. 1, a cage 41 is secured to the mounting support 13 by means of screws 42, the cage being integral with gear 43. The entire mechanism including the mounting support and the cage is rotatable in the casing by means of a setting device later to be described.

Normally the mechanism is maintained in a fixed position relatively to the casing preferably by friction means, a large spring washer being shown for this purpose at 44 bearing against a shoulder 45 of the casing and the gear 43.

A setting device may be provided for rotating the instrument mechanism relatively to the case. In the illustrated embodiment a manually operable setting knob 46 is shown mounted on a shaft 47 bearing a pinion 48 at its lower end. The shaft is axially movable in the casing, sufficient space being provided in the lower bearing 48 for downward movement.

In the illustrated instrument a helical spring 51 is employed for normally maintaining the pinion 48 in engagement with the gear 43, the spring bearing against a shoulder 50 in the pinion with one end and against a shoulder 52 in the front ring 12 with the other.

In the drawings, however, the knob is shown in its uppermost position in which it will permit setting of the contact device later to be described. If the knob is rotated while the gears 48 and 43 are in engagement, the mechanism and the pointer are rotated relatively to the dial whereby it is possible to adjust the instrument for changes in barometric pressure. The means of setting are also illustrated in Fig. 2 where corresponding parts are designated by corresponding reference numerals.

The setting knob 46 on the shaft 47 is shown as driving two pinions 48 and 53. When the knob and the pinions are moved into the lowermost position, pinion 48 will engage the gear 43 to which the instrument mechanism is connected. In the same setting position the pinion 53 will engage a gear 54 carrying a pinion 55 which meshes with a large gear 56. The large gear carries dial 57 graduated in barometric units, this dial being readable through a window 58 in the dial 34. A reference marker 59 is suitably provided at the window for reading the dial 57 thereon.

When the barometric pressure changes, the instrument is adjusted to indicate correct altitude by rotating the instrument mechanism by means of the setting knob 46 until the existing atmospheric pressure, at sea level, appears below the reference marker 59.

The cage 41 in Fig. 1 is provided with a flange 60. A rotatable support 61 is movably arranged on the flange of the cage by means of lugs or ears 62 secured to the support by machine screws 63. The support 61 carries part of the contact mechanism for setting adjustment relatively to the spindle 29.

In the illustrated form of instrument, a post 64 is riveted to the rotatable support 65 and carries with two arms 66 and 67 a frame 68 about a pivotal axis defined by pivoting screws 69 and 70. In Fig. 2 the post is shown in slightly different form at 64', this modification being necessitated by the exploded view.

A roller 71 is mounted for rotation about its axis, for displacement along its axis, and also for movement in a plane normal to its axis. In the illustrated embodiment, this freedom of movement is accomplished by mounting the roller 71 on a thin spindle or wire 72 in the frame 68 giving the roller freedom of movement about its axis and along its axis. The roller is further free to become displaced in a plane normal to its axis by reason of its being mounted on the pivoted frame at a distance from the pivotal axis 69, 70.

Means are provided for normally urging the roller against the spindle 29. In the illustrated form of instrument a contact spring is utilized for this purpose as will later appear.

Means are provided for actuating the contact device in response to movements of the roller other than rotation about the roller axis. In the illustrated instrument the contacts are actuated in response to displacement of the roller in a plane normal to its axis of rotation causing a tilting of the frame 68 about the pivotal axis 69, 70. The frame may suitably be insulated from electric circuits by means of insulating studs 73 and 74 bearing against contact springs 75 and 76 cooperating with contact screws 77 and 78 (Fig. 5). Spring 75 rests against stud 73 thus urging the frame and the roller towards the spindle.

When the roller is moved away from the axis of the spindle 29, the frame 68 is tilted in clockwise direction about the pivotal axis 69, 70 thus pressing contact spring 75 against contact screw 77 and closing this pair of contacts while permitting spring 76 to become separated from contact screw 78 thus breaking the contact therebetween.

The contact screws 77 and 78 are shown as supported by metal brackets 79 and 80 mounted to an insulating member 81 by means of screws 82 and 83 respectively, the latter screws also mounting soldering terminals 84 and 85.

Terminals are also provided for the contact springs. In the illustrated form a joint terminal is formed by a metal strip 86 riveted to the insulating member 81 at 87 and mounting a soldering terminal 88.

Preferably arc preventing means are employed to prevent an arc from forming at a break contact. In the illustrated embodiment each pair of contacts is connected in a circuit containing a condenser 89 or 90 and a reactance 91. The arc preventing circuits are thus as follows:

The pair of contacts 75, 77 is protected by the circuit including leads 92, 93, condenser 89, leads 94, 95, reactance 91, leads 96, 97, soldering terminal 88 and the metal strip 86 to which the contact spring 75 is metallically connected.

The circuit for the pair of contacts 76, 78 includes leads 98, 99, condenser 90, leads 100, 95, reactance 91, leads 96, 97, terminal 88 and the metal strip 86 to which the contact spring 76 is connected.

Whenever an arc is formed due to the breaking of a contact, the arc is quickly extinguished by the arc preventing circuit in a manner well known in the art.

The illustrated embodiment comprises a three pole plug 101 having three prongs 102, 103, 104. Prong 103 is connected to lead 97 by a lead 105. Prong 102 is connected to lead 92 through a fuse 106 and leads 107 and 108. Prong 104 is connected to lead 98 through a fuse 109 and leads 110 and 111.

The movement in a plane normal to the axis of rotation is imparted to the roller 71 by means of a cam shaped structure on the spindle 29. The cam structure is particularly well visible in Figs. 4 and 5.

Referring to Fig. 5, it is apparent that a movement of spindle 29 about its axis will cause a displacement of the roller 71 in an upward direction thus resulting in a tilting movement of the frame 68 in a clockwise direction.

The cam shaped structure may be formed on the spindle by cutting on the spindle two threads, one of lesser and one of larger diameter. At the point where the diameter changes from a small to a large diameter, there is formed a cam, thus actuating the contact mechanism in the hereinbefore described manner.

Figs. 3 and 4 show a fragmentary view of a preferred form of spindle and roller in which the spindle has a uniform outside diameter D. The portion of lesser diameter of the spindle is shown as having a reduced root diameter $d_r$ while the root diameter for the other portion is larger and designated $D_r$.

The pitch of the spindle is preferably constant and in the order of 100 to 120 threads per inch, the preferred number being 112. The smaller root diameter is preferably twelve one-thousandths of an inch smaller than the larger root diameter thus resulting in an eccentricity of the cam of six one-thousandths of an inch.

By tests it has been determined that even as steep a cam curvature as will lead from the smaller diameter to the larger diameter within 6° of movement of the cam will not adversely affect the accuracy of the altimeter or break a contact within a predetermined change in altitude of only 15 feet at any presettable point within its range of 35,000 ft.

The means for presetting the contact device to operate at a predetermined altitude will now be described.

A presetting of the contact device is accomplished by causing a relative movement between the roller, mechanism, and cam or spindle. This can be accomplished by maintaining unchanged the operative relation between the roller and the cam or spindle and by modifying the operative relation between the spindle and the actuating mechanism.

The preferred way of adjustment, however, is to maintain unchanged the operative relation between the actuating mechanism and the cam or spindle and to adjust the roller relatively to the spindle. This is accomplished, in the illustrated embodiment, by means for rotating the roller about the cam or spindle.

Assuming the roller be in contact with the surface of the cam, it appears that a rotation of the roller about the cam will result in a movement of the roller onto a higher or lower point on the cam. Upon further movement the roller will continue to roll in the threads of the portion of larger or lesser diameter as the case may be.

The movement of the roller about the axis of the spindle is accomplished, in the illustrated embodiment, by rotating the rotatable support 61 on the shoulder 60 of the cage by means of a gear 112 secured to or integral with the support 61.

In the embodiment illustrated in Fig. 1, the setting pinion 48 is shown in engagement with the gear 112. A turning of the knob 46 will thus result in a movement of the roller about the spindle, it being noted that the spindle and the indicating means remain unaffected by the setting movement. Means are suitably provided for indicating the setting position of the contact mechanism. Such means may assume the form illustrated in Fig. 2 in which reference markers 113 and 114 are provided movable relatively to the dial and interconnected to move in the same ratio as the pointers 33 and 35.

In the illustrated embodiment the reference marker 113 is carried by an annular gear 115 meshing with the pinion 53 and driving a second annular gear 116 with the reference marker 114 mounted thereon over a reduction gear 117 and 118. The annular gear 115 moves equiangularly with the gear 112 connected to the contact mechanism. Thus the position of the roller relatively to the cam portion of the spindle is distinctly indicated by the markers 113 and 114.

Means are provided for connecting the rotatable contact mechanism to the terminals fixedly mounted on the casing. In the illustrated embodiment, such means comprise slip rings 119, 120 and 121 on the support 61 cooperating with brushes 122, 123 and 124 on the case. One of the leads, 105, is visible in Fig. 1 connecting the brush 123 with the terminals in the case. The case is provided with a fuse box 125, and a pipe fitting 126 for connection of the interior of the instrument case to a point of static pressure.

The length of the spindle depends on the operating and setting range of the instrument. The illustrated embodiment is designed to have an indicating and a setting range of both 35,000 feet, it being so constructed that the larger pointer makes one revolution for 1,000 feet of change in altitude.

The number of threads on the spindle depends on the setting range for the contact device and is easily determined as follows:

Assuming that the contact device is to be settable for actuation within the entire range of the instrument, that is from zero to 35,000 feet, it appears that the spindle will have to be constructed so as to permit the roller to make a contact at the beginning of the range of 35,000 feet as well as the end.

If contact is made at the beginning of the range, the roller will have to travel on the portion of the large diameter for about 35 revolutions of the spindle. If the contact is made at the end of the range, the roller will have to travel approximately 35 turns on the small diameter portion of the spindle. Allowing about two revolutions for adjustment for atmospheric pressure and two revolutions at each end of the spindle beyond the extreme point of travel of the roller, the total of threads on the spindle will amount to 35+35+4 times 2, that is, 78 threads.

The entire number of turns in the thread thus may be computed as follows:

Range of the instrument plus the setting range plus the number of revolutions required for zero adjustment plus two revolutions at each end of the spindle.

A modified form of contact device is shown in Fig. 6 in which the spindle 29' is mounted in a bracket 64' on a rotatable support 61'. The roller 71' is mounted on a thin spindle 72' for rotation and axial displacement. The spindle is mounted in a jewel bearing 127 with its lower end, and in a slot 128 with its upper end, the slot being radially disposed with respect to the axis of the threaded spindle and of a width slightly larger than the diameter of the thin spindle 72'.

The spindle 72' may thus be deflected into a position indicated by a dash-dot line to actuate with an insulating collar 129, a pair of contact springs 130, 131. In the illustrated embodiment, the spring 131 serves normally to maintain the roller in contact with the threaded spindle 29'.

The displacement of the roller in a plane normal to its axis of rotation and the actuation of the contacts 130 and 131 occurs when the roller moves onto the cam portion of the threaded spindle connecting the portion of lesser and the portion of larger diameter as explained in the previous embodiment.

Friction between the roller and the spindle can be materially reduced by means of a stop limiting the movement of the roller towards the axis of the spindle. Such stops are shown in the illustrated embodiments at 132 in Figs. 2 and 5 and at 133 in Fig. 6.

The stop is preferably so adjusted as to permit safe engagement between the roller and the threads without, however, permitting the roller to touch the root of the thread. This is illustrated in Fig. 3 where a slight clearness is visible between the periphery of the roller and the root of the threads. While the frame in Figs. 2 and 5 and the thin spindle 72' in Fig. 6 rest against the stop, the biasing force acts on the stop rather than on the roller thus resulting in substantial reduction of friction.

Obviously the present invention is not restricted to the particular embodiments shown herein and described. Moreover it is not indispensible that all the features of this invention be used conjointly since they may advantageously be employed in various combinations and sub-combinations.

What is claimed is:

1. In a measuring instrument the combination with an element rotatable in response to the magnitude of a condition; of a threaded spindle connected to be moved in proportion to the rotation of said element, said spindle having a portion of lesser and a portion of larger diameter; a roller; a movable member supporting said roller for rotative and for axial movement; means for urging said roller against said spindle; and a pair of contacts actuable by the movement of said member.

2. In a measuring instrument the combination of a threaded spindle having a portion of lesser and a portion of larger diameter; a roller having its axis substantially parallel with the axis of the spindle; mounting means supporting said spindle and roller for relative movement therebetween in an axial direction as well as for relative movement in a plane normal to the axis of the roller, said mounting means including an element urging said roller against said spindle; a pair of contacts connected to be actuated by the movements of said roller in a plane normal to the axis of the roller; and means rotatable in response to the magnitude of a condition connected to impart to said spindle and roller a relative movement therebetween about the axis of said spindle.

3. In a measuring instrument the combination of a threaded spindle having a portion of lesser and a portion of larger diameter; a roller; a rockable member supporting said roller for movement about and along the axis of the roller; means urging said roller against said spindle; a pair of contacts actuable by the rocking movement of said member; and means rotatable in response to the magnitude of a condition connected to impart to said spindle and roller a relative movement about the central axis of the spindle, thus causing the roller to travel along the spindle, whereby the contacts will be actuated when the roller moves from one of said portions of the spindle onto the other.

4. In a measuring instrument the combination of a threaded spindle having a portion of lesser and a portion of larger diameter, said spindle being rotatable about its axis and constituting a first rotatable unit; a roller; a movable member supporting said roller for rotative and for axial movement; means for urging said roller against said spindle, said roller, member and means constituting a second unit rotatable relatively to said first unit and about the axis of the spindle; an element movable in response to the magnitude of a condition and connected to rotate one of said units; a pair of contacts actuable by the movement of said member; and setting means for rotating the other of said units about the axis of said spindle, whereby the contacts will be actuated when the roller moves from one portion of the spindle onto the other, the magnitude of the condition at which the contacts will be actuated being presettable at said setting means.

5. In a measuring instrument the combination of a threaded spindle having a portion of lesser and a portion of larger diameter, said spindle being rotatable about its axis; a roller; a rotatable support; a movable member mounted on said support and supporting said roller for rotative and for axial movement; means for urging said roller against said spindle; a pair of contacts actuable by the movement of said member; an element movable in response to the magnitude of a condition and connected to rotate said spindle; and setting means for rotating said support about said spindle, whereby the contacts will be actuated when the roller moves from one portion of the spindle onto the other, the magnitude of the condition at which the contacts will be actuated being presettable at said setting means.

6. In a measuring instrument the combination of a threaded spindle having a portion of lesser and a portion of larger diameter, said spindle being rotatable about its axis and constituting a first rotatable unit; a roller; a movable member supporting said roller for rotative and for axial movement; means for urging said roller against said spindle, said roller, member and means constituting a second unit rotatable relatively to said first unit and about the axis of the spindle; an element movable in response to the magnitude of a condition and connected to rotate one of said units; a pair of contacts actuable by the movement of said member; manually operable setting means for rotating the other of said units about the axis of said spindle; and indicating means connected to said setting means for indicating the setting position thereof, whereby the contacts will be actuated when the roller moves from one portion of the spindle onto the other, the magnitude of the condition at which the contacts will be actuated being presettable at said setting means.

7. In a measuring instrument the combination of a threaded spindle having a portion of lesser and a portion of larger diameter, said spindle being rotatable about its axis; a roller; a rotatable support; a movable member mounted on said support and supporting said roller for rotative and for axial movement; means for urging said roller against said spindle; a pair of contacts actuable by the movement of said member; an element movable in response to the magnitude of a condition and connected to rotate said spindle; manually operable setting means for rotating said support about said spindle; and indicating means connected to said setting means for indicating the setting position thereof, whereby the contacts will be actuated when the roller moves from one portion of the spindle onto the other, the magnitude of the condition at which the contacts will be actuated being presettable at said setting means.

8. In a measuring instrument the combination of a cam rotatable about an axis, said cam having a portion of lesser and a portion of larger diameter; a roller; a support rotatable coaxially with said cam; a movable member mounted on said support and supporting said roller for rotation about the roller axis; means for urging said roller against said cam; a pair of contacts actuable by the movement of said member; an element movable in response to the magnitude of a condition and connected to rotate said cam; and setting means for rotating said support about said cam, whereby the condition may be preset at which the contacts will be actuated.

9. In a measuring instrument the combination of a cam rotatable about an axis, said cam having a portion of lesser and a portion of larger diameter; a roller; a support rotatable coaxially with said cam; a movable member mounted on said support and supporting said roller for rotation about the roller axis, said member having an insulating portion; a pair of insulated contact elements separate from said member, said elements being mounted on said support and actuable by the movements of said member by means of said insulating portion; means for urging said roller against said cam; means movable in response to the magnitude of a condition and connected to rotate said cam; and setting means for rotating said support about said cam, whereby the condition may be preset at which the contacts will be actuated.

10. In a measuring instrument the combination of a threaded spindle having a portion of lesser and a portion of larger diameter, said spindle being rotatable about its axis; a rotatable support; a roller; a member mounted on said support for rocking movement and supporting said roller for rotative and for axial movement, said member having an insulating portion; a pair of contacts, said pair comprising a contact fixedly mounted on said support, and a resilient contact associated with said fixed contact, the resilient contact being mounted on said support and bearing against said insulating portion, thereby urging said roller against said spindle; an element movable in response to the magnitude of a condition and connected to rotate said spindle; and setting means for rotating said support about said spindle, whereby the contacts will be actuated when the roller moves from one portion of the spindle onto the other, the magnitude of the condition at which the contacts will be actuated being presettable at said setting means.

11. In a measuring instrument the combination of a threaded spindle having a portion of lesser and a portion of larger diameter, said spindle being rotatable about its axis; a rotatable support; a roller; a frame pivotally mounted on said support for rocking movement said frame having a wire strung therein parallel to said spindle for supporting said roller for rotative and axial movement, the frame having an insulating portion; a pair of contacts, said pair comprising a contact fixedly mounted on said support, and a resilient contact associated with said fixed contact, the resilient contact being mounted on said support and bearing against said insulating portion, thereby urging said roller against said spindle; an element movable in response to the magnitude of a condition and connected to rotate said spindle; and setting means for rotating said support about said spindle, whereby the contacts will be actuated when the roller moves from one portion of the spindle onto the other, the magnitude of the condition at which the contacts will be actuated being presettable at said setting means.

12. In a measuring instrument the combination of a threaded spindle having a portion of lesser and a portion of larger diameter, said spindle being rotatable about its axis; a rotatable support; a roller; a shaft supporting said roller for rotation as well as axial displacement along said shaft, said shaft being mounted on said support to extend substantially parallel to said spindle, one end of said shaft being free to move towards, and away from, said spindle; a spring urging the free end of the shaft and roller towards said spindle; a pair of contacts actuable by the movements of the free end of said shaft; an element movable in response to the magnitude of a condition and connected to rotate said spindle; and setting means for rotating said support about said spindle, whereby the contacts will be actuated when the roller moves from one portion of the spindle onto the other, thereby moving said shaft, the magnitude of the condition at which the contacts will be actuated being presettable at said setting means.

13. In a measuring instrument the combination with an element rotatable in response to the magnitude of a condition; of a threaded spindle connected to be moved in proportion to the rotation of said element, said spindle having a portion of lesser and a portion of larger diameter; a roller; movable means for supporting said roller for rotative and for axial movement and including means for urging said roller against said spindle; a pair of contacts actuable by the movements of said supporting means; and setting means for adjusting said spindle and said movable supporting means relatively to each other about the axis of said spindle independently of said element.

14. In a measuring instrument the combination with an element rotatable in response to the magnitude of a condition; of a contact device having a pair of contact members movable relatively to each other, said contact device including a threaded spindle connected to be moved in proportion to the rotation of said element; a roller; a support; means for mounting said roller on said support for rotation about, and for movement along, the roller axis in engagement with the threads of said spindle, said axis being parallel with the axis of said spindle; and setting means for adjusting said spindle and support relatively to each other about the axis of said spindle independently of said element.

15. In a measuring instrument the combination with an element rotatable in response to the magnitude of a condition; of a contact device having a pair of contact members movable relatively to each other, said contact device including a threaded spindle connected to be moved in proportion to the rotation of said element; a roller; and means for supporting said roller for rotation about, and for movement along, its axis in engagement with the threads of said spindle, said axis being parallel with the axis of said spindle.

16. In a measuring instrument the combination of a first rotatable element in the form of a cam rotatable about an axis, said cam having a portion of lesser and a portion of larger diameter; a roller; a second rotatable element in the form of a support rotatable coaxially with said cam; a movable member mounted on said support and supporting said roller for rotation about the roller axis; means for urging said roller against said cam; a pair of contacts actuable by the movement of said member; means movable in response to the magnitude of a condition and connected to rotate one of said elements in dependence on changes in the condition; and setting means for rotating the other of said elements about said first named axis, whereby the condition may be preset at which the contacts will be actuated.

17. In a measuring instrument the combination with an element rotatable in response to the magnitude of a condition; of a contact device having contact members movable relatively to one another, said contact device including a threaded spindle, a roller, and means for supporting said roller for rotation about, and for translatory movement along, its axis in engagement with the threads of the spindle, said axis being parallel with the axis of said spindle, said rotatable element being connected to rotate said roller and said spindle relatively to each other about the axis of the spindle.

18. An altimeter comprising, in combination, a pressure sensitive actuating element; a contact device actuated by said element; means for setting said contact device for a predetermined altitude; and means for modifying the operative relation between said element and said contact device to correct for changes in atmospheric pressure.

19. An altimeter comprising, in combination, a pressure sensitive diaphragm capsule; a contact device actuated by said capsule; manually operable first means for setting said contact device for actuation by said capsule at a predetermined altitude; and manually operable second means for producing a relative adjustment between said capsule and said contact device to correct for changes in atmospheric pressure.

20. An altimeter comprising, in combination, a pressure sensitive actuating element; a contact device actuated by said element; means for setting said contact device for actuation by said element at a predetermined altitude; first indicating means for indicating the setting of said contact device; means for modifying the operative relation between said element and said contact device to correct for changes in atmospheric pressure; and second indicating means for indicating the operative relation between said element and said contact device in terms of atmospheric pressure.

21. An altimeter comprising, in combination, a pressure sensitive diaphragm capsule; a contact device; motion amplifying mechanism for actuating said contact device in dependence on movements of the diaphragm capsule; manually operable means for setting said contact device for actuation by said capsules at a predetermined altitude; first indicating means for indicating the setting of said contact device in terms of altitude; manually operable means for modifying the operative relation between said diaphragm capsule and said contact device to correct for changes in atmospheric pressure; and second indicating means for indicating the operative relation between said element and said contact device in terms of atmospheric pressure.

22. An altimeter comprising, in combination, a pressure sensitive diaphragm capsule; a contact device connected to said capsule for actuation thereby; first means for modifying the operative relation between said capsule and said contact device to set said contact device for actuation at a predetermined altitude; second means for correcting the operative relation between said capsule and said contact device for changes in atmospheric pressure; and a manually operable member for selectively actuating either said first or said second means.

23. An altimeter comprising, in combination, a pressure sensitive diaphragm capsule; a contact device connected to said capsule for actuation thereby; first means for modifying the operative relation between said capsule and said contact device to set said contact device for actuation at a predetermined altitude; second means for correcting the operative relation between said capsule and said contact device for changes in atmospheric pressure; an indicating element associated with said first means for showing the altitude setting of the contact device; an indicating element associated with said second means for showing the setting for atmospheric pressure; and a manually operable setting knob for selectively actuating said first or said second means.

24. An altimeter comprising, in combination, a pressure sensitive diaphragm capsule; a pair of contacts; means for actuating said contacts, said means including a cam member rotatable about an axis, a movable element engaging said cam member, and a supporting member rotatable about the cam axis and supporting said movable element; motion amplifying mechanism connected to said capsule and said actuating means for rotating one of said members about said axis in dependence on the movement of said capsule; and manually operable means for rotating said other member about said axis, whereby the altitude may be preset at which said contacts will be actuated.

25. An altimeter comprising, in combination, a pressure sensitive diaphragm capsule; a pair of contacts; means for actuating said contacts, said means including a cam member rotatable about an axis, a movable element engaging said cam member, and a supporting member rotatable about the cam axis and supporting said movable element; motion amplifying mechanism connected to said capsule and said actuating means for rotating one of said members about said axis in dependence on the movement of said capsule; manually operable means for rotating said other member about said axis whereby the altitude may be preset at which said contacts will be actuated; and manually operable means for modifying the operative relation between said capsule and said contact actuating means, whereby the device may be adjusted for changes in atmospheric pressure.

26. An altimeter comprising, in combination, a pressure sensitive diaphragm capsule; a pair of contacts; means for actuating said contacts, said means including a cam member rotatable about an axis, a movable element engaging said cam member, and a supporting member rotatable about the cam axis and supporting said movable element; motion amplifying mechanism connected to said capsule and said actuating means for rotating one of said members about said axis in dependence on the movement of said capsule; manually operable means for rotating said other member about said axis; and indicating means connected to said other member for indicating the setting of said other member in terms of altitude.

27. An altimeter comprising, in combination, a pressure sensitive diaphragm capsule; a pair of contacts; means for actuating said contacts, said means including a cam member rotatable about an axis, a movable element engaging said cam member, and a supporting member rotatable about the cam axis and supporting said movable element; motion amplifying mechanism connected to said capsule and said actuating means for rotating one of said members about said axis in dependence on the movement of said capsule; manually operable means for rotating said other member about said axis; indicating means connected to said other member for indicating the setting of said other member in terms of altitude; manually operable means for modifying the operative relation between said capsule and said contact actuating means; and indicating means connected to said last named manually operable means for indicating the said operative relation in terms of atmospheric pressure.

28. An altimeter comprising, in combination, a pressure sensitive diaphragm capsule, a pair of contacts; means for actuating said contacts, said means including a cam member rotatable about an axis, a movable element engaging said cam member, and a support rotatable about the cam axis and supporting said movable element; motion amplifying mechanism for actuating said cam member in response to movements of said diaphragm capsule; manually operable means for rotating said support, whereby the altitude may be preset at which the contacts will be actuated; and indicating means showing the relative position between said cam member and said support in terms of altitude.

29. An altimeter comprising, in combination, a pressure sensitive diaphragm capsule, a pair of contacts; means for actuating said contacts, said means including a cam member rotatable about an axis, a movable element engaging said cam member, and a support rotatable about the cam axis and supporting said movable element; motion amplifying mechanism for actuating said cam member in response to movements of said diaphragm capsule; manually operable first means for rotating said support about said axis, whereby the altitude may be preset at which the contacts will be actuated; first indicating means connected to said support and showing the setting of the support in terms of altitude; manually operable second means for producing an additional movement of said cam member independent of the adjustment of said cam member by said diaphragm capsule; and second indicating means connected to said second means and reading in terms of atmospheric pressure.

30. An altimeter comprising, in combination, a pressure sensitive diaphragm capsule; altitude indicating means operated by said capsule; a contact device operated by said capsule; means for setting said contact device for actuation at a predetermined altitude; and means for jointly correcting the position of both said indicating means and said contact device for changes in atmospheric pressure.

31. An altimeter comprising, in combination, a pressure sensitive diaphragm capsule; altitude indicating means operated by said capsule; a contact device operated by said capsule; means for setting said contact device for actuation at a predetermined altitude; and manually operable means for modifying the operative relation between said capsule on one hand, and said indicating means and contact device on the other hand for correcting for changes in atmospheric pressure.

32. An altimeter comprising, in combination, a pressure sensitive diaphragm capsule; an altitude dial; first indicating means actuated by said capsule and movable relatively to said dial; a contact device actuated by said diaphragm capsule; setting means for setting said contact device for actuation by said capsule at a predetermined altitude; and second indicating means actuated by said setting means and movable relatively to said dial.

33. An altimeter comprising, in combination, a pressure sensitive diaphragm capsule; a dial bearing an altitude graduation; first indicating means actuated by said capsule, movable relatively to said dial and readable on said graduation; a contact device actuated by said diaphragm capsule; setting means for setting said contact device for actuation by said capsule at a predetermined altitude; and second indicating means actuated by said setting means, movable relatively to said dial and readable on said graduation.

34. An altimeter comprising, in combination, a pressure sensitive diaphragm capsule; a dial; first indicating means actuated by said capsule and movable relatively to said dial; a contact device actuated by said diaphragm capsule; adjusting means for correcting both the position of said indicating means and of said contact device for changes in atmospheric pressure; and indicating means visible at the dial and actuated by said adjusting means.

35. An altimeter comprising, in combination, a pressure sensitive diaphragm capsule; a dial; first indicating means actuated by said capsule and movable relatively to said dial; a contact device actuated by said diaphragm capsule; setting means for setting said contact device for actuation by said capsule at a predetermined altitude; second indicating means visible at the dial, actuated by said setting means and reading in terms of altitude; adjusting means for modifying the operative relation between said capsule on one hand, and said first indicating means and contact device on the other hand, to correct for changes in atmospheric pressure; and third indicating means visible at the dial, actuated by said adjusting means and readable in terms of atmospheric pressure.

PAUL KOLLSMAN.